Patented Mar. 19, 1940

2,193,982

UNITED STATES PATENT OFFICE 2,193,982

MINERAL WOOL

Charles F. Ramseyer, Chicago, Ill.

No Drawing. Application November 2, 1936,
Serial No. 108,907

4 Claims. (Cl. 106—36.3)

The principal object of the present invention is the provision of a new and improved product, namely, mineral wool, made from a hitherto unused raw material, namely, coal ashes.

By mineral wool is ordinarily meant a fine fibrous "wool-like" material, made by blowing a small falling stream of molten rock or similar material, or molten rock or the like mixed with material, such as metallurgical slag, with a jet of steam or air under pressure.

One commercial form of mineral wool in use today is commonly made by melting an argillaceous limestone in which the molecular ratio of acid oxides (principally silica and alumina) to basic oxides (principally lime and magnesia) is about one to one. The rock is quarried, transported to the plant and melted with coke in a cupola, from which the molten stream issues and is blown with steam or air from a nozzle into a chamber or other space arranged to receive the rock wool.

Instead of melting rock or the like, sometimes the slags resulting from the smelting of various metallic ores, such as lead and copper, have been found to be suitable for remelting in a cupola and blowing into a mineral wool, the product being usually referred to in this case as "slag wool". Attempts to blow the molten slags directly from the smelters without cooling and remelting have commonly been unsuccessful, due principally to a lack of control of the temperature and rate of flow of the slag from the smelting furnaces. Also, slags from iron blast furnaces have been used, but in this case there are sulfides present with the result that when the wool is later exposed to the moisture in the air chemical reactions take place by which various sulfur acids are formed. These acids are likely to corrode any metal with which the wool may come into contact, and for this reason iron blast furnace slag wool has a rather limited application in the industry.

Some of the disadvantages encountered in the production of mineral wool by the processes mentioned above have been the high cost of production and the difficulty of securing a uniform product. Where the rock has to be quarried and transported to the mineral wool plant, relatively expensive fuel (usually coke) purchased to melt the rock, and steam generated, usually at low efficiencies in a small size boiler plant, with which to blow the molten rock it will be clear that such mineral wool is a relatively expensive product. Also, since practically the only method of controlling the temperature, viscosity and chemical content of the molten material is by changing the ratio of rock or slag to the coke charged in the cupola, it can be seen that the control of the molten material is very far from being either instantaneous or automatic, since in most plants it is a matter of hours before the material charged in at the top of the cupola can influence the temperature or composition of the molten material coming from the tap hole.

With these factors in mind, the principal object of the present invention, as stated above, is a relatively great reduction in cost of producing mineral wool and it is a further object of the present invention to improve the quality and uniformity of mineral wool.

Still further, another object of the present invention is the production of a new and improved mineral wool in which, as to chemical content, iron oxide, probably in the ferrous state (FeO), can be substituted for the lime and magnesia usually employed at the present time as part of the basic component of an oxide mixture capable of being blown into a mineral wool.

These and other objects and advantages of the present invention will be apparent to those skilled in the art after a consideration of the following detailed description.

In carrying the present invention into effect, I utilize ashes from coal fired boiler plants and the like, the disposal of which at present is ordinarily an item of expense rather than profit, in the formation of my new and improved product, namely, mineral wool. Preferably, I utilize ashes from "wet-bottom" or "slag-tap" furnaces. Furnaces of this type have been developed within the last few years and are particularly adapted to use pulverized coal. In furnaces of this type, the temperature is kept high enough so that the ash of the coal collects on the floor of the furnace in a molten condition and can be drawn or tapped off at will, either continuously or at intervals as may be desired. Ordinarily, the pulverized coal is blown into the furnace, this method of firing being particularly advantageous with coals having a low fusion point ash, such low fusion point frequently being due to the presence of iron oxide in the ash, the iron oxide being originally present in the coal, largely as iron disulfide or pyrites (FeS$_2$). The molten ash may be blown into mineral wool directly as the molten material runs out of the furnace, but since it is not practical to operate the furnace under constant conditions, I prefer to run the ash while hot and in a molten state into a container or bath in which the temperature, and hence the viscosity, of the molten ash can be accurately adjusted to the most advantageous point for the blowing of the wool.

Temperature and viscosity are the two principal factors influencing the quality of the resultant wool, and of these two, the viscosity is the more important. When the viscosity is at the right point the molten substance is blown by a jet of air or steam under pressure in the usual manner.

By thus taking the ash as it is drawn from the furnace in molten state and suitably adjusting its viscosity, as by raising or lowering the temperature of the molten substance, important economies in operation are realized, due to the fact that the substance from which the wool is blown is already in a molten state, and in addition greater uniformity is secured since the viscosity at the time of blowing is maintained more nearly uniform.

One of the important advantages of using molten coal ashes, entirely aside from their availability as a by-product of no value at the present time and in the practical utilization of the residual heat contained in the molten material, is that the mineral wool produced from coal ashes contains an appreciable percentage of iron oxides and is much softer than the ordinary commercial rock wool in which the basic constituent is composed practically wholly of the lighter metal oxides, as for example, calcium oxide and magnesium oxide. The molten material containing basic oxides in which the major portion is made up of iron oxides will best flow freely at about a temperature of 2400° F., and if blown at this temperature the best results are secured, the fibers being soft and flexible and have an average diameter, I have found, of from 2 to 6 microns, the average diameter usually being about 3 microns. The proportion between the acid and basic oxides of a mixture capable of being blown into a mineral wool will, of course, vary with the type of coal burned in the furnace and also to some extent upon the conditions under which the furnace operates. For example, by using a given coal with a given furnace, I have produced mineral wool from boiler coal ash having in the neighborhood of 40% silica and alumina oxides and in the neighborhood of 35% iron oxides. It will be recognized that a material containing an appreciable percentage of iron oxide could not be melted successfully in a cupola furnace with coke, since the iron oxide is quite reducible at temperature above the melting point of the ash and would react with the coke to form metallic iron, which would change the composition and temperature of the molten mass. Therefore by retaining and utilizing the residual heat in the molten ash as it comes from the furnace, the relatively small amount of heat that is required to be added to or subtracted from the molten ash can be done in a container or bath, as mentioned above.

Since boiler furnaces ordinarily operate at different rates at different times of the day, due to fluctuations in the demand for steam, it would be very difficult to make a uniform quality of mineral wool by blowing the molten ash just as it is tapped directly from the boiler. I therefore tap it more or less continuously into a small furnace or vessel of which I can control the temperature, so that the bath of slag in this intermediate or conditioning furnace is maintained at all times at the proper viscosity for producing the best wool.

I have found that for a molten coal ash slag, such as the one for which the chemical analysis was given above, a temperature at which it will just flow freely, around 2400° F., as it hits the blast seems to give about the best results, but the proper temperature, or more particularly the proper viscosity, that is most suitable for any given molten ash would, of course, have to be determined individually for each such ash. So far as I am aware, it is new to employ iron oxide, rather than lime and magnesium oxides, as part of the basic component of the mixture to be blown into mineral wool, with only a small proportion of lime and magnesia, usually approximately 10% or less. In ordinary commercial rock wool, the iron oxide content amounts to not more than 2 or 3% by weight. I have also found that the mineral wool that I have produced by the above process scarcely ever contains as much as one-tenth of 1% of sulphur. As a matter of fact, usually the sulphur content of the molten ash from the furnace rarely contains any more sulphur than the above amount, and even this small amount is not stable and is apparently oxidized and driven out in heating and blowing of the molten material. While it is true that many coals may contain up to 5% sulfur, and it would seem that the coal ash coming from the furnace might also contain appreciable quantities of sulphides, yet, however, this is not the case, for sulphides are stable only under reducing conditions and in basic slags, whereas a boiler furnace is a fuel oxidizing, not reducing, apparatus. For this reason, since practically all commercial coal ashes form acid, rather than basic slags, such small amounts of sulfur as may initially enter the slag are rapidly driven therefrom.

Mineral wool produced from coal ashes containing an appreciable percentage of iron oxide is much softer than the ordinary commercial rock wool in which the basic constituent is composed practically wholly of the lighter metal oxides, lime (CaO) and magnesia (MgO). The fibers are more flexible and are non-penetrating; that is, there are no heavy, stiff fibers that work their way into the skin of persons handling the wool I have made from fused coal ashes.

Thus, according to the present invention, I am enabled to take a waste by-product, that is, molten coal ashes which is not only of little or no value at the present time but is usually an item of expense on account of the need for disposal thereof, and convert this waste by-product into a highly useful and valuable by-product in the form of a mineral wool of uniform quality and superior characteristics, and at a cost far lower than any of the present methods for making a similar grade of mineral wool. Specifically, by the utilization of the waste molten ashes from slag bottom pulverized fuel fired boilers, the entire cost of quarrying, transporting and melting rock or slag for the production of mineral wool is avoided; due to the substitution of iron oxides for calcium and similar oxides in the composition of the mineral wool, I obtain a softer, more desirable product than the ordinary commercial rock wool type of mineral wool and without excessive temperature requirements in the blowing of the molten material.

Having now described my invention, what I claim as new and desire to secure by Letters Patent is:

1. A mixture capable of being formed into mineral wool comprising approximately 50% oxides of silicon and aluminum, approximately 35% oxide of iron, and approximately 10% calcium and magnesium oxides.

2. A by-product of the operation of a coal fired furnace comprising a mineral wool having approximately 35% oxide of iron and less than 10% of lime and magnesium.

3. As a new material, mineral wool having a lime and magnesia content less than 10% and an iron oxide content of over 35%.

4. A mineral wool batch comprising a coal ash having a calcium and magnesium oxide content less than 10%, a silicon and aluminum oxide content of approximately 50%, and an iron oxide content greater than 25%.

CHARLES F. RAMSEYER.